(12) United States Patent
Dou et al.

(10) Patent No.: US 6,468,484 B1
(45) Date of Patent: Oct. 22, 2002

(54) NO₂ ABATEMENT COMPOSITION WITH ENHANCED SULFUR RESISTANCE

(75) Inventors: Danan Dou, Tulsa; Owen H. Bailey, Claremore, both of OK (US)

(73) Assignee: Delphi Technologies, Inc., Troy, MI (US)

( * ) Notice: Subject to any disclaimer, the term of this patent is extended or adjusted under 35 U.S.C. 154(b) by 3 days.

(21) Appl. No.: 09/652,247

(22) Filed: Aug. 31, 2000

Related U.S. Application Data

(60) Provisional application No. 60/215,018, filed on Jun. 29, 2000.

(51) Int. Cl.[7] ............................. B01J 8/02; B01J 23/10; B01D 53/54
(52) U.S. Cl. ............................. 423/213.2; 423/239.1; 502/303; 502/304
(58) Field of Search ................................. 502/303, 304, 502/325, 326, 328, 339, 340, 302, 332, 333, 334; 423/239.1, 213.2

(56) References Cited

U.S. PATENT DOCUMENTS

| | | | |
|---|---|---|---|
| 5,863,508 A | 1/1999 | Lachman et al. | 422/171 |
| 5,874,057 A | 2/1999 | Deeba et al. | 423/239.1 |
| 5,888,464 A | 3/1999 | Wu et al. | 423/213.5 |
| 5,916,129 A | 6/1999 | Modica et al. | 60/274 |
| 5,939,037 A | 8/1999 | Hepburn et al. | 423/213.5 |

FOREIGN PATENT DOCUMENTS

EP 931590 A1 * 7/1999 ............ B01J/37/02

\* cited by examiner

*Primary Examiner*—Wayne A. Langel
*Assistant Examiner*—Maribel Medina
(74) *Attorney, Agent, or Firm*—Vincent A. Cichosz

(57) ABSTRACT

A $NO_x$ adsorber composition comprising a substrate; and a washcoat, wherein said washcoat comprises a catalytic metal component, a trapping material, and a porous support, wherein said porous support comprises cerium oxide and an oxygenated metal selected from the group consisting of lanthanum oxide, yttrium oxide, neodymium oxide, and combinations comprising at least one of the foregoing oxygenated metals.

29 Claims, 5 Drawing Sheets

NO$_2$ ABATEMENT COMPOSITION WITH ENHANCED SULFUR RESISTANCE

CROSS-REFERENCE TO RELATED APPLICATION(S)

The present invention claims the priority date of copending United States Provisional Patent Application Ser. No. 60/215,018, filed Jun. 29, 2000.

FIELD OF THE INVENTION

The present invention is broadly concerned with NO$_x$ abatement, particularly with NO$_x$ abatement in the exhaust gas of lean-burn internal combustion engines.

BACKGROUND OF THE INVENTION

It is well known in the art to utilize catalyst compositions, such as those commonly referred to as three-way conversion catalysts ("TWC") to treat the exhaust gases of internal combustion engines. Such catalysts have been found to successfully promote both the oxidation of unburned hydrocarbons ("HC") and carbon monoxide ("CO"), and the reduction of nitrogen oxides ("NO$_x$") in the exhaust gas, provided that the engine is operated at or close to an air/fuel ratio balanced for stoichiometric combustion (i.e., between about 14.4 and about 14.7; "combustion stoichiometry"). Currently, much research is underway to develop gasoline fueled engines, such as those used for passenger automobiles and the like, to operate under lean conditions, for at least part of the time, to achieve better fuel economy. Under lean conditions, the air to fuel ratio (A/F) and combustion mixture supplied to the engine are maintained above combustion stoichiometry so that the resulting exhaust gases are "lean", i.e. the exhaust gases are relatively high in oxygen content and relatively low in reductant content, e.g. HC, CO and/or hydrogen.

Although lean burn engines provide enhanced fuel economy, they have the disadvantage that a conventional three-way conversion catalyst cannot adequately abate the NO$_x$ component of pollutants in the gas stream, as is required in order to meet increasingly stringent emission control regulations being implemented throughout the world. Efforts to increase NO$_x$ removal from exhaust gas emissions have resulted in the development of NO$_x$ adsorbers which typically comprise a sorbent material to remove NO$_x$ from a fuel-lean gas stream. While NO$_x$ adsorbers have been shown to remove NO$_x$ pollutants from exhaust gases, they suffer from the serious drawback that they are readily poisoned by sulfur also present in exhaust gases.

Without being bound to any particular theory of operation, it is believed that, under lean conditions, NO$_x$ present in the gas stream is sorbed onto the NO$_x$ adsorber in the form of stable metal nitrates, thereby removing NO$_x$ from the gas stream to be discharged to the atmosphere. A catalytic component is believed to promote such sorption. During rich conditions (i.e., high reductant content) reductants in the gas stream decompose the stable metal nitrates in the NO$_x$ adsorber, releasing NO$_x$ from the adsorber. The released NO$_x$ contacts a NO$_x$ abatement catalyst in the presence of reductants and, under suitable conditions (e.g., sufficiently elevated temperature), the NO$_x$ is reduced to nitrogen or to nitrogen and N$_2$O.

By a mechanism similar to that for the formation of the stable metal nitrates, sulfur oxides present in the gas stream are sorbed onto the NO$_x$ adsorber in the form of very stable metal sulfate salts. Unlike the storage nitrates which readily decompose under rich conditions, decomposition of the metal sulfates requires a combination of rich gas and elevated operating temperature. This combination of conditions may not occur with sufficient frequency under normal operating conditions for typical lean burn gasoline and diesel engines. As a result, the NO$_x$ storage sites are gradually poisoned by sulfur, and the NO$_x$ conversion capability of the catalyst gradually degrades to unacceptable levels for efficient exhaust purification.

The NO$_x$ adsorber compositions disclosed herein provide enhanced recovery from poisoning by sulfur compounds, while retaining their NO$_x$ abatement efficiency.

BRIEF DESCRIPTION OF THE DRAWINGS

For a further understanding of the nature of the present invention, as well as other features and advantages thereof, reference should be made to the following detailed description taken in conjunction with the accompanying drawings, which are meant to be exemplary, not limiting, and wherein.

SUMMARY OF INVENTION

Figure 1:
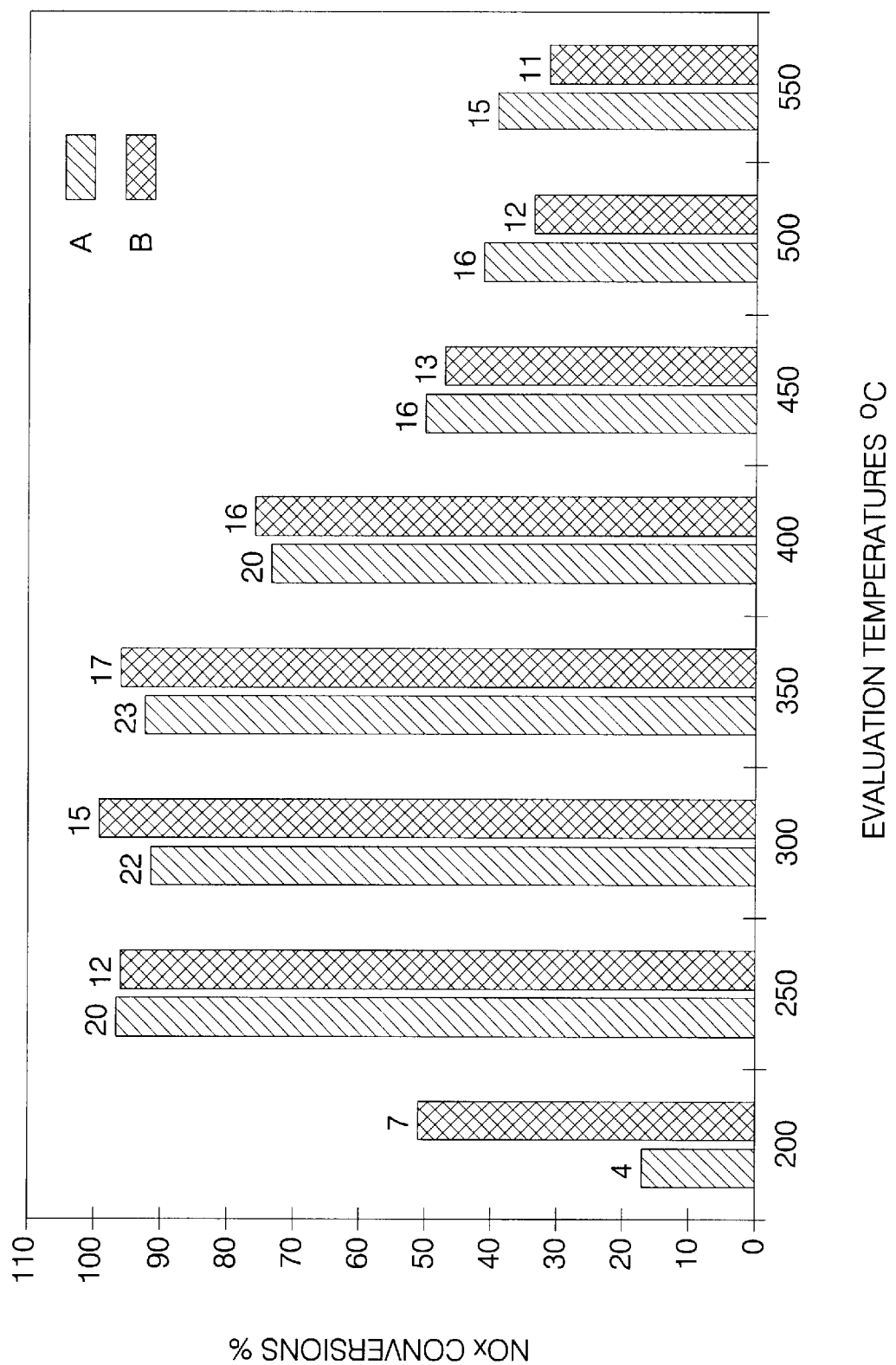
FIG. 1 is a bar graph comparing the NO$_x$ conversion efficiency and regeneration time at different temperatures for two composition.

The shortcomings and disadvantages of the prior art are overcome by a NO$_x$ adsorber composition comprising a substrate; and a washcoat, wherein said washcoat comprises a catalytic metal component, a trapping material, and a porous support, wherein said porous support comprises cerium oxide and an oxygenate metal selected from the group consisting of lanthanum oxide, yttrium oxide, neodymium oxide, and combinations comprising at least one of the foregoing oxygenated metals.

Further advantages and embodiments of the present invention will be understood by those skilled in the art in light of the detailed description and figures.

DETAILED DESCRIPTION OF THE PREFERRED EMBODIMENT

The NO$_x$ adsorber composition is characterized by a porous support material comprising a ceria-containing mixed oxide, with platinum selectively anchored thereon, resulting in improved resistance to sulfur poisoning.

Ceria-containing mixed oxides are useful in three-way conversion catalysts due to their stable oxygen storage capacity (OSC), which serves to broaden the air/fuel ratio range around the combustion stoichiometric point, where high conversion levels for CO, HC, and $NO_x$ can be obtained simultaneously. However, such oxygen storage capacity is undesirable with $NO_x$ adsorber compositions because extra fuel is consumed to reduce the stored oxygen, thereby reducing the fuel efficiency. Accordingly, the current state of the art teaches that it is undesirable to incorporate OSC-containing components into $NO_x$ adsorber compositions due to the resultant negative impact on fuel economy.

In contrast to conventional wisdom, unexpected advantages associated with the incorporation of cerium-containing mixed oxides into $NO_x$ adsorber compositions have been discovered. While not to be limited by theory, the cerium-containing compositions disclosed herein serve as sulfur scavengers which protect the $NO_x$ adsorber storage metals from sulfur poisoning, and subsequently facilitate sulfur release from the $NO_x$ adsorber under rich conditions and at high temperatures.

The $NO_x$ adsorber compositions disclosed herein comprise a substrate with a washcoat comprising a porous support, a catalytic metal component, and one or more $NO_x$ trapping materials (such as alkali metals, alkaline earth metals, and the like, and combinations comprising at least one of the foregoing) disposed thereon. The catalytic metal component and $NO_x$ trapping materials can be impregnated, loaded, imbibed, coated, or otherwise disposed on and/or within the porous support.

The porous support, which comprises at least two oxygenated metal compounds, one being cerium oxide ($CeO_2$), and the other being any oxygenated metal compound suitable to form a stabilized cerium-containing mixed oxide. Suitable oxygenated metal compounds include zirconium oxide ($ZrO_2$), lanthanum oxide ($La_2O_3$), yttrium oxide ($Y_2O_3$), and neodymium oxide ($Nd_2O_3$), and the like, as well as combinations comprising at least one of these oxygenated metal compounds, with $ZrO_2$ being preferred. In the case of a mixed oxide containing $ZrO_2$ and $CeO_2$, the mixed oxide may comprise $ZrO_2$ and $CeO_2$ in the full range of $ZrO_2$/$CeO_2$ weight percent ratios. That is, the mixed oxide may comprise $ZrO_2$ in an amount greater than the amount of $CeO_2$, or may comprise $ZrO_2$ in an amount less than the amount of $CeO_2$.

The porous support further comprises one or more other support materials suitable for use at the high operation temperatures associated with an internal combustion engine (e.g., up to about 1,000° C.). Such materials include, but are not limited to, zeolite, alumina and the like, as well as combinations comprising at least one of the foregoing, with gamma-alumina, theta-alumina, delta-alumina, and combinations thereof being preferred. The porous support may comprise up to about 50 wt % of cerium-containing mixed oxide, the balance being other support materials; with about 3 wt % to about 25 wt % cerium-containing mixed oxide, the balance being other support materials being more preferred.

The washcoat has a catalytic metal component disposed on and/or in the porous support. The catalytic metal component comprises platinum group metals, such as, platinum (Pt), rhodium (Rh), palladium (Pd), ruthenium (Ru), iridium (Ir) and osmium (Os), as well as alloys and combinations comprising at least one of the foregoing. Preferably, the washcoat is loaded with the catalytic metal component in an amount of up to about 5% of the washcoat, with an amount of about 0.2 wt % to about 3 wt % more preferred, and an amount of about 0.5 wt % to about 2.5 wt % especially preferred.

Where the catalytic metal component is a combination of platinum with one or more other metals, the other metals, e.g., palladium, rhodium and the like, are typically present in an amount less than the platinum. More particularly, with a platinum/palladium combination, the catalytic metal component can comprise up to about 85 wt % platinum and up to about 45 wt % palladium (or other metal); with about 55 wt % to about 80 wt % platinum and about 20 wt % to about 45 wt % palladium preferred. With a platinum/rhodium combination, for example, the catalytic metal component can comprise up to about 95 wt % platinum and up to about 30 wt % rhodium; with about 70 wt % to about 85 wt % platinum and about 2.5 wt % to about 20 wt % rhodium preferred; and about 70 wt % to about 80 wt % platinum and about 5 wt % to about 10 wt % rhodium especially preferred.

In addition to the catalytic metal component, the porous support may be further loaded with one or more $NO_x$ trapping materials, such as alkali metals, alkaline earth metal, and mixtures comprising at least one of the foregoing. Suitable trapping materials include barium (Ba), lithium (Li), potassium (K), magnesium (Mg), sodium (Na), cesium (Cs), strontium (Sr), and combinations comprising at least one of the foregoing, with a mixture of Ba and K being preferred. Generally, the washcoat comprises up to about 50 wt % trapping material, with an amount of up to about 40 wt % preferred, and an amount of about 5 wt % to about 20 wt % being especially preferred, based upon the total weight of the washcoat. For example, in the case of a trapping material comprising a Ba and K mixture, the Ba is present in an amount up to about 30 wt % of the washcoat, and K is present in an amount up to about 10 wt %. More preferably, the trapping material comprises Ba in an amount of about 7 wt % to about 20 wt % of the washcoat, and K in the amount of about 2 wt % to about 5 wt % of the washcoat.

The washcoat can be supported on a substrate which is suitably stable in the high temperature exhaust gas environment (e.g., up to about 1,000° C.), such as cordierite, mullite, metallic substrates, and the like, as well as combinations comprising at least one of the foregoing. The substrate may be in any suitable configuration, often being employed as a monolithic honeycomb structure, spun fibers, corrugated foils or layered materials. Other materials useful as a substrate in an exhaust gas system are apparent to those skilled in the art.

Formation of the $NO_x$ adsorber catalyst comprises application of the washcoat to the substrate as a mixture or the application of the washcoat components in sequential steps, in a manner which would be readily apparent to those skilled in the art of catalyst manufacture. For example, the porous support, catalytic metal component, and/or trapping materials can be combined to form a slurry. The slurry can then be applied to the substrate. Preferably, however, the washcoat is first applied to the substrate followed by drying and calcination. The catalytic metal component and trapping materials can then be deposited on or within the washcoat by any suitable manner, such as by impregnation techniques well known to those skilled in the art. According to such techniques, the catalytic metal component and trapping materials, individually or together, would be dissolved as soluble precursors (e.g., as a salt like potassium nitrate) in an aqueous or organic solvent which is then impregnated into the porous support. Preferably, the catalytic metal components are impregnated prior to the trapping materials. The trapping material and catalytic metal component precursors can also be dissolved together in a common solution and impregnated into the washcoat in a single step.

For example, loading of the catalytic metal component onto the washcoat may be accomplished with a catalytic metal precursor solution. Suitable precursor solutions are aqueous solutions which facilitate efficient chemisorption of the catalytic metal onto the washcoat. Suitable precursor solutions include platinum nitrate solution, platinum chloride solution, and similar materials and combinations thereof, with platinum nitrate solution being preferred.

The catalytic metal precursor solution can be applied to the cerium-containing mixed oxide prior to mixing with other washcoat components. For example, in an embodiment wherein the washcoat comprises alumina and a cerium-containing mixed oxide, alumina is added after the precursor solution is applied to the mixed oxide. This preparation method facilitates the selective deposition of catalytic metal onto the cerium-containing mixed oxide surface, rather than onto other components of the porous support (e.g., the other support materials, such as $BaCO_3$ and $Al_2O_3$). Selective deposition of platinum on the cerium-containing mixed oxide enhances the $NO_x$ adsorber's resistance to sulfur poisoning.

Not to be limited by theory, it is believed that platinum facilitates the oxidation of $SO_2$ emissions to $SO_3$. The $SO_3$ in turn readily reacts with the cerium-containing mixed oxide to form cerium sulfate ($Ce_2(SO_4)_3$). As demonstrated in equations (a) through (d) below, $Ce_2(SO_4)_3$ decomposes much more readily under rich conditions than other metal sulfates which typically form in $NO_x$ adsorber systems of the prior art, such as $BaSO_4$. Thus, the selective deposition of platinum onto the cerium-containing mixed oxide allows for fast and efficient $NO_x$ adsorber recovery from sulfur poisoning.

(a) $Ce_2(SO_4)_3$ reduction by $H_2$ is spontaneous from about 0° C. to about 1,000° C.;
$Ce_2(SO_4)_3+12H_2(g)=Ce_2O_3+3H_2S(g)+9H_2O(g)$; [$\Delta G<0$ from 0° C. to 1000° C.].

(b) In contrast, $Ba_2SO_4$ reduction by $H_2$ is spontaneous only above 800° C.;
$BaSO_4+4H_2(g)=BaO+3H_2O(g)+H_2S(g)$; [$\Delta G \leq 0$ above about 800° C.].

(c) $Ce_2(SO_4)_3$ can be reduced by CO above 370° C.;
$Ce_2(SO_4)_3+3CO(g)=Ce_2O_3+3SO_2(g)+3CO_2(g)$; [$\Delta G \leq 0$° C. above 370° C.].

(d) In contrast, $BaSO_4$ cannot be reduced by CO within a reasonable temperature range;
$BaSO_4+CO(g)=BaCO_3+SO_2(g)$; [$\Delta G > 0$ from 0° C. to 1,000° C.].

The degree of selectivity of platinum for the cerium-containing mixed oxide varies with the method of catalyst preparation. As an example, the catalyst preparation method described in Example III below results in about 100% platinum deposition on the ceria-containing mixed oxide.

Other aspects and advantages of the $NO_x$ abatement compositions disclosed herein will be more apparent to those skilled in the art in view of the following Examples and corresponding Figures, which are meant to be exemplary and not limiting. These Examples illustrate some of the possible techniques for making the $NO_x$ adsorber compositions.

EXAMPLE I

The following example can be used to form a $NO_x$ adsorber comprising a washcoat having, as main components, 17.1 wt % barium, 10.6 wt % zirconium oxide-cerium oxide, and 65.5 wt % aluminum oxide, based upon the total weight of the washcoat of 4.7 g/in³ (grams per cubic inch).

530.41 g of 22.94% platinum nitrate solution was sprayed onto 940.6 g of mixed oxide (25 wt % $ZrO_2$/75 wt % $CeO_2$) with constant mixing. The resulting powder was stored for 12 hrs followed by mixing into a slurry comprising 7901 g of barium-alumina powder (19.1 wt % barium on a commercial delta-alumina) made by calcination of barium acetate solution with the alumina powder. The slurry was then milled and pH adjusted to 6–7 using acetic acid, followed by coating the slurry onto a substrate of 400 cpsi (cells per square inch). Excess slurry was removed from the substrate by vacuum or pressurized air and the coated catalyst was then calcined. Rhodium was then applied using a known post impregnation method followed by another calcination.

EXAMPLE II

The following example is another technique which can be used to form a $NO_x$ adsorber comprising a washcoat having, as main components, 17.1 wt % barium, 10.6 wt % zirconium oxide-cerium oxide, and 65.5 wt % aluminum oxide, based upon the total weight of the washcoat of 4.7 g/in³.

105.17 g of 27.84% platinum nitrate solution was diluted to 460 g total solution with distilled $H_2O$ 230 g of mixed oxide (25 wt % $ZrO_2$/75 wt % $CeO_2$) was added to the solution, followed by about one hour of mixing. After mixing, 1932 g of barium-alumina powder (19.1 wt % barium) was added to the slurry. The slurry was then milled, coated onto a substrate, calcined, and rhodium impregnated as described above.

EXAMPLE III

The following example is yet another technique which can be used to form a $NO_x$ adsorber comprising a washcoat having, as main components, 17.1 wt % barium, 10.6 wt % zirconium oxide-cerium oxide, and 65.5 wt % aluminum oxide, based upon the total weight of the washcoat of 4.7 g/in³.

464.0 g of 29.76% platinum nitrate solution was sprayed onto 9226 g of mixed oxide (25 wt % $ZrO_2$/75 wt % $CeO_2$) with constant mixing. The resulting powder was calcined at 250° C. for 2 hrs followed by mixing into a slurry comprising 7745 g barium-alumina powder (19.1 wt % barium). The slurry was then milled, coated onto a substrate, calcined, and rhodium impregnated as described above.

For all of the Figures, the support material of Formulation A comprises cerium-containing mixed oxides as disclosed herein. The support material of Formulation B comprises alumina. These Formulations were made in accordance with the technique set forth in Example 1. Complete loading information for each formulation is shown in Table 1.

TABLE I

|  | Formulation A | Formulation B |
|---|---|---|
| Pt | 110 g/ft³ | 110 g/ft³ |
| Rh | 11 g/ft³ | 11 g/ft³ |
| Ba | 1389 g/ft³ | 1389 g/ft³ |
| Mixed Oxide: | 0.5 g/in³ | none |
| Cerium Oxide | 527 g/ft³ |  |
| Zirconia | 160 g/ft³ |  |
| Lanthanum | 15 g/ft³ |  |
| $Al_2O_3$ | 3.08 g/in³ | 4.08 g/in³ |

Formulation A—Pt is supported on mixed-oxide
Formulation B—Pt is supported on $Al_2O_3$ The following Figures establish that $NO_x$ adsorbers with washcoats comprising cerium-containing mixed oxides recover a relatively large fraction of fresh $NO_x$ conversion capability following engine aging with sulfur-containing fuel, thus allowing their application for prolonged periods on lean burn engines operating on sulfur-containing fuels.

As shown in FIG. 1, prior to aging, each formulation provided similar levels of $NO_x$ abatement. In each case, $NO_x$ conversions were measured as a function of inlet temperature during a lean/rich modulation cycle (30 seconds lean/2 seconds rich). On the synthetic gas tester, the duration of the rich regeneration was controlled by an oxygen sensor and regeneration times for each test condition were measured (times are indicated on each bar). The adsorber containing cerium (formulation A) required longer regeneration times. This is the anticipated result due to the oxygen storage capacity associated with the cerium, which results in consumption of reductants such as HC and CO. Such reductants could otherwise be used to regenerate and reduce $NO_x$ stored in an adsorber. Such consumption of reductants causes a negative impact on fuel economy, and as a result, cerium incorporation into adsorber formulations has been considered undesirable.

Figure 2:
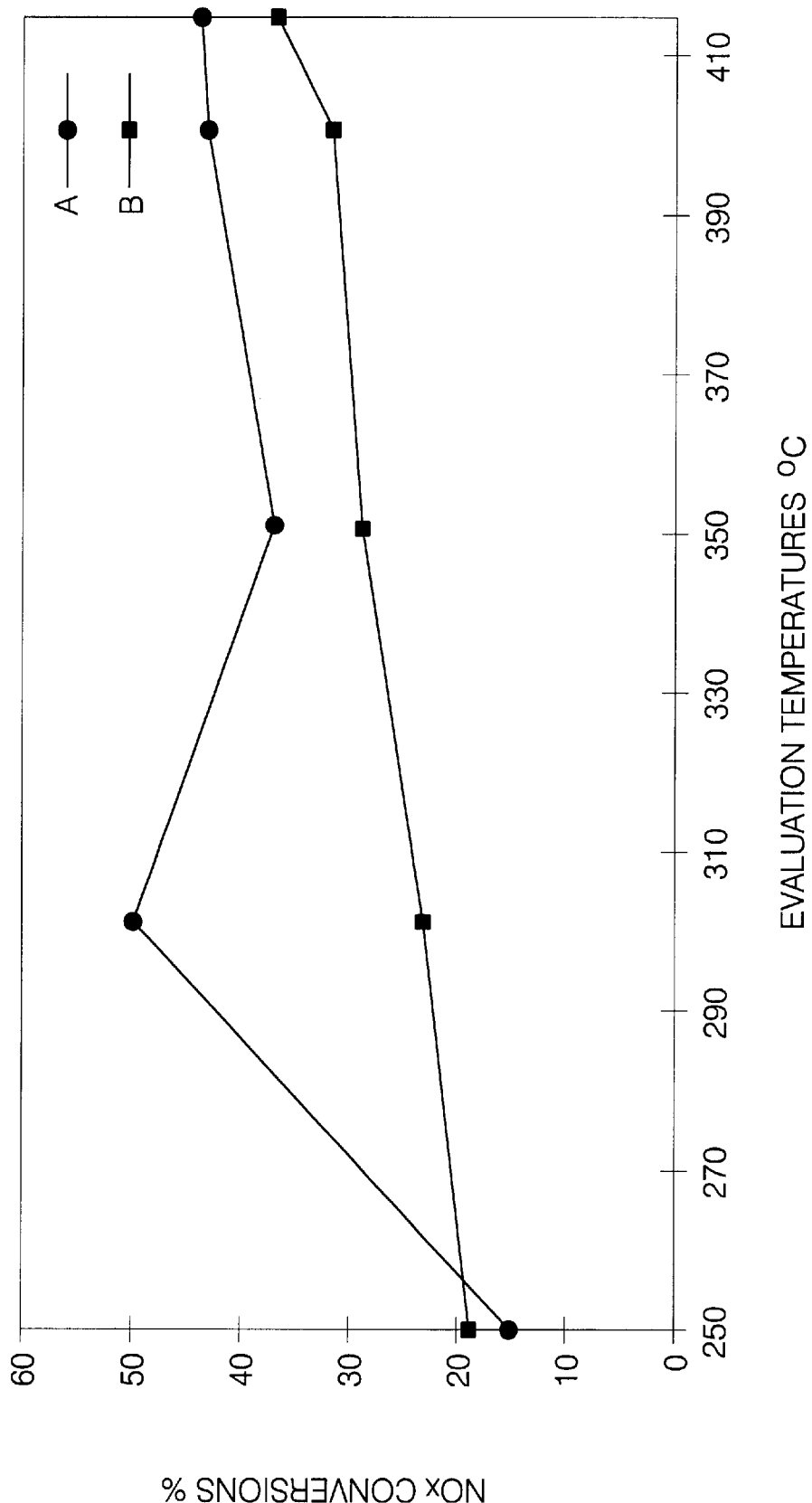
FIG. 2 is a graphical representation of NO$_x$ conversion levels under lean/rich modulations of 30 seconds lean (air/fuel ratio of 21.5) to 25 seconds rich (air/fuel ratio of 12.5) after 64 hours of fuel cut engine aging at 750° C. inlet temperature and 100–150 ppm sulfur present.
Figure 3:
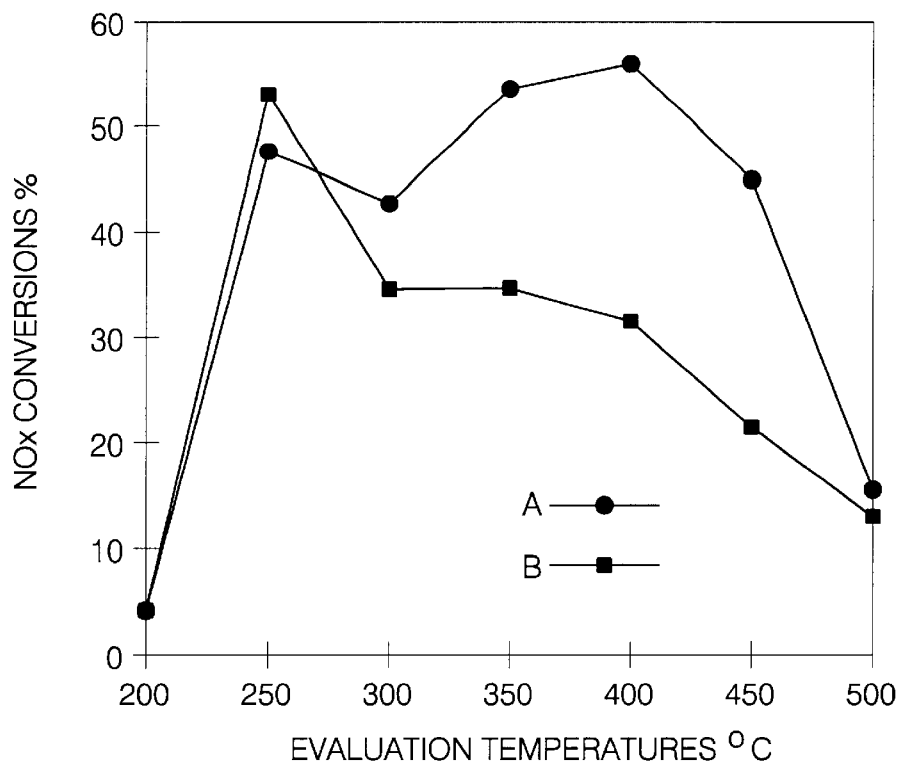
FIG. 3 is a graphical representation of NO$_x$ conversion versus temperature during lean/rich modulations (30 seconds lean (air/fuel ratio of 21.5)/25 seconds rich (air/fuel ratio of 12.5)) after 64 hours of fuel cut engine aging at 750° C. inlet temperature and 100–150 ppm sulfur present.
Figure 4:
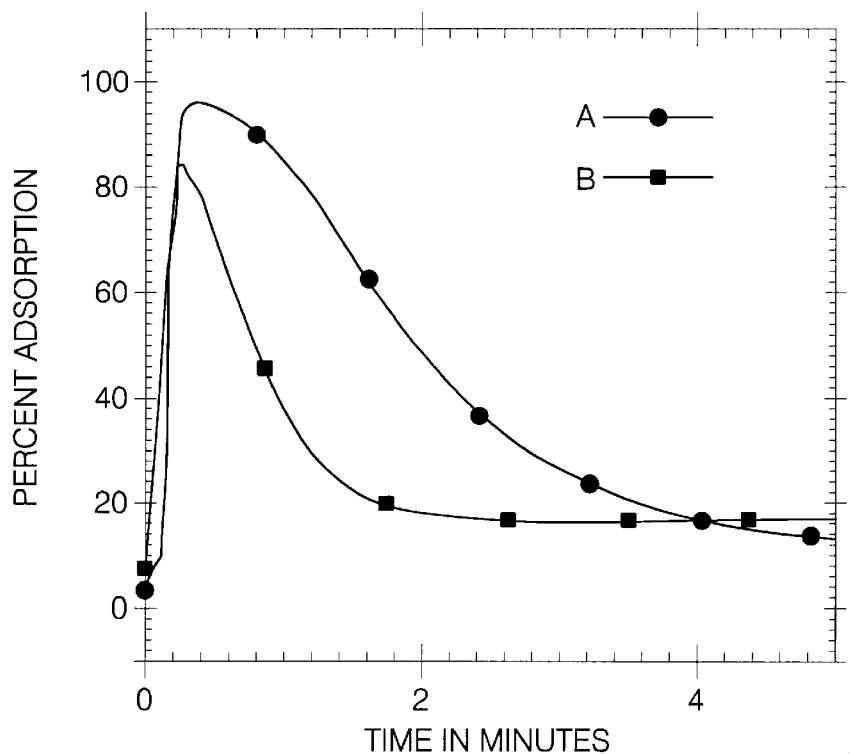
FIG. 4 is a graphical representation of NO$_x$ adsorption capacity over time for two compositions after 64 hours of fuel cut engine aging at 750° C. inlet temperature and 100–150 ppm sulfur present.

FIGS. 2, 3 and 4 show the results of comparative testing between Formulation A and Formulation B, following a 64 hour fuel cut engine aging at 750° C. inlet temperature, and about 100–150 ppm fuel sulfur. The performance of each formulation was measured during lean/rich modulation on an engine bench. In each case, the lean cycle was 30 seconds with an air to fuel ratio of 21.5, and the rich cycle was 1.67 seconds with an air to fuel ratio of 12.5. FIG. 2 shows Formulation A having superior $NO_x$ conversion performance following aging. FIG. 3 shows Formulation A having superior $NO_x$ conversion performance following aging and subsequent rich desulfation. FIG. 4 shows Formulation A having superior $NO_x$ adsorption capacity following aging and subsequent rich desulfation.

Figure 5:
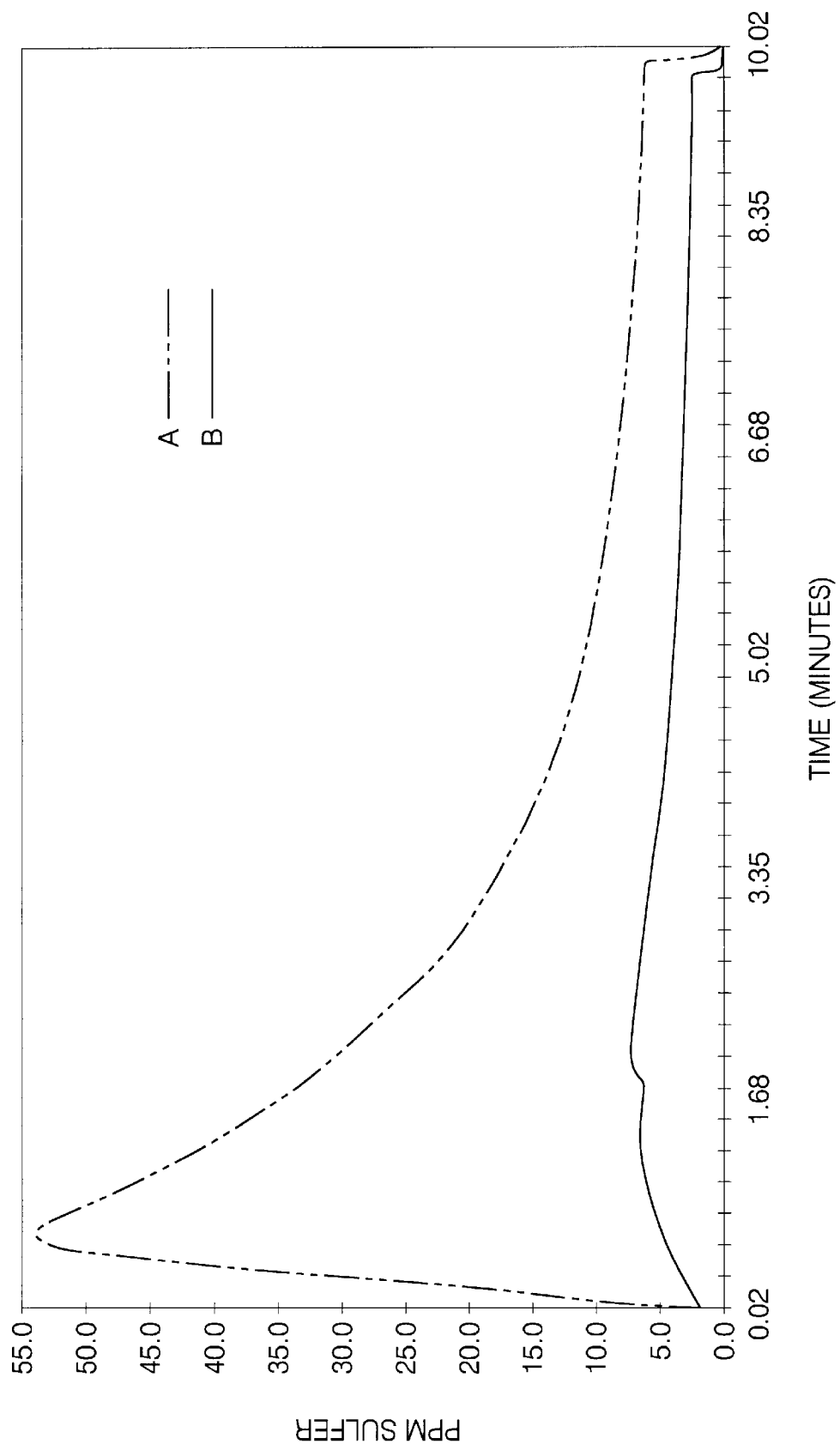
FIG. 5 is a graphical representation of sulfur release over time at 700° C. (air/fuel ratio of 13) for two compositions after 64 hours of fuel cut engine aging at 750° C. inlet temperature and 100–150 ppm sulfur present.

For FIG. 5 the release of sulfur from the fuel cut engine-aged samples of Example V(a) was observed (64 hour fuel cut engine aging, 750° C. inlet temperature, and about 100–150 ppm fuel sulfur), using a sulfur sensitive detector. Under equivalent conditions of inlet temperature (700° C.) and air/fuel ratio (A/F=13) for Formulation A and Formulation B, a higher quantity of sulfur was released with Formulation A, as shown in FIG. 5.

Table II compares platinum (Pt) and barium sulfate crystallite sizes of Formulation A and Formulation B after aging (64 hour fuel cut engine aging, 750° C. inlet temperature, and about 100–150 ppm fuel sulfur). In an advantage over the prior art (Formulation B), crystallite sizes are markedly smaller with Formulation A, as shown. The smaller size of each crystallite yields a larger amount of platinum and barium sulfate surface area overall, thus leading to enhanced sulfate release with Formulation A.

TABLE II

|  | Formulation A | Formulation B |
| --- | --- | --- |
| $BaSO_4$ crystallite size after 64 hr fuel cut aging | 460–600 Å | >1000 Å |
| Pt crystallite size after 64 hr fuel cut aging | 152 Å | 306 Å |
| Pt crystallite size after 900° C. oven aging | 540 Å | 820 Å |

Figure 6:
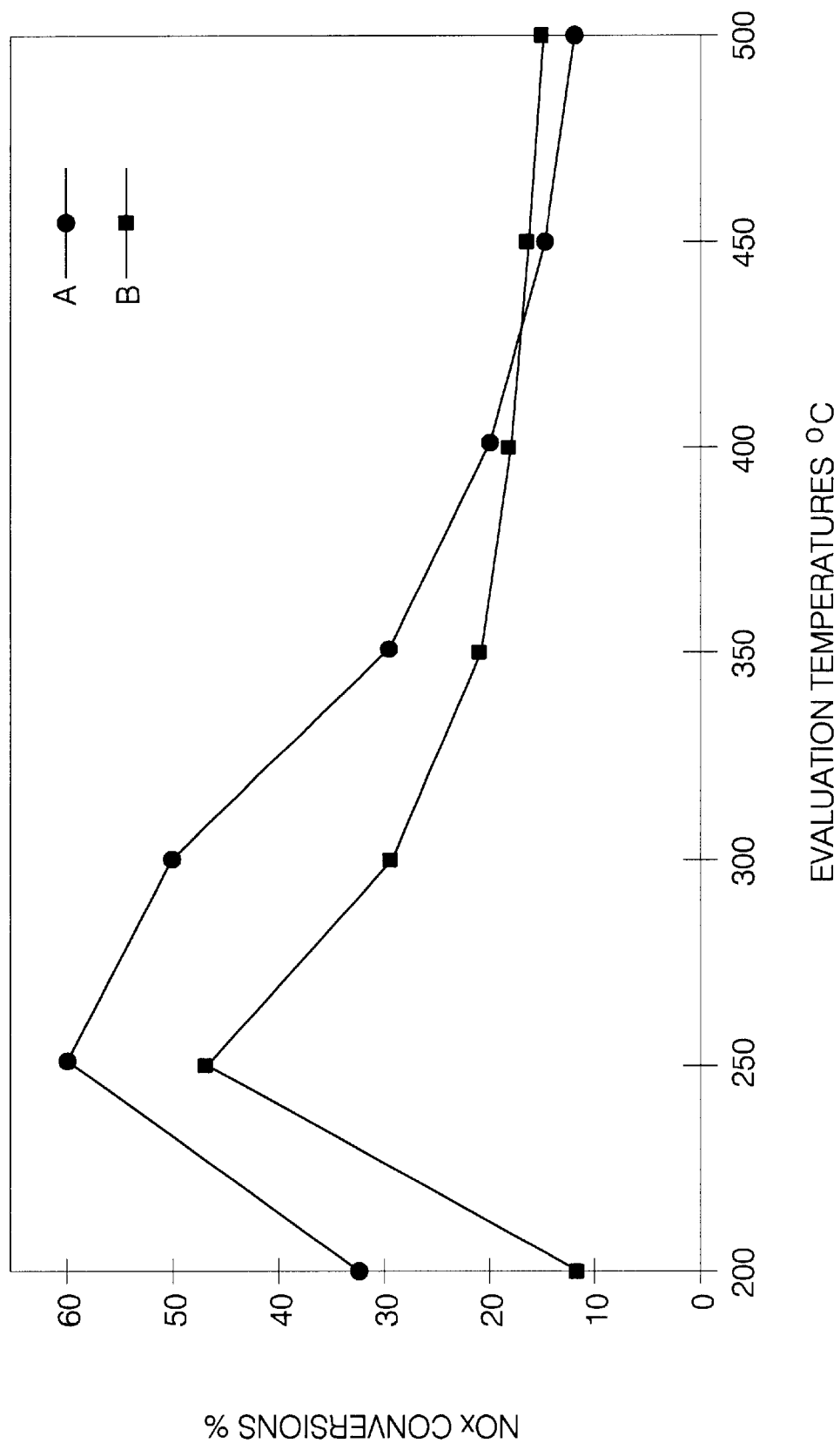
FIG. 6 is a graphical representation of NO$_x$ conversion over time for two compositions after 30 hours of fuel cut engine aging at 400° C. (30 seconds lean/2 seconds rich) and 10 ppm sulfur dioxide.

FIG. 6 shows the results of comparative testing between Formulation A and Formulation B, following a 30 hour modulation aging at 400° C. inlet temperature, 10 ppm $SO_2$. As shown, Formulation A exhibited higher levels of $NO_x$ conversion under conditions of lean/rich modulation (30 seconds lean/2 seconds rich), thus showing increased sulfur resistance with the $NO_x$ adsorber comprising cerium-containing mixed oxide.

The use of a washcoat comprising a cerium-containing mixed oxide was found to enhance the recovery of the $NO_x$ adsorber from sulfur poisoning. (See FIG. 5) This is largely due to the unstable nature of the cerium/sulfur compound formed when sulfur (as $SO_2$ or $SO_3$) contacts the $NO_x$ adsorber. Cerium sulfate $Ce_2(SO_4)_3$ is relatively unstable and quickly decomposes, resulting in relatively fast and efficient $NO_x$ adsorber recovery from sulfur poisoning. The efficient $Ce_2(SO_4)_3$ decomposition is largely due to reduction by $H_2$ and CO, as shown in equations (a) through (d) set forth above.

Moreover, in another advantage, use of cerium-containing mixed oxide in the washcoat enhances the steam reforming reaction $[HC+H_2O=CO+3/2H_2]$ within the $NO_x$ abatement system, which ultimately yields relatively high amounts of reductants $H_2$ and CO. Such enhanced reductant formation results in an increased decomposition rate of metal sulfates such as $Ce_2(SO_4)_3$, as well as the more stable $BaSO_4$. The increased rate of metal sulfate reduction leads to faster recovery from sulfur poisoning.

While it is known to use $CeO_2$ in pure, bulk form in $NO_x$ adsorbers, the discovery of the use of cerium-containing mixed oxides provides a number of advantages, including improved thermal stability of the composition after thermal aging (e.g., about 900° C. for about 6 hours under air atmosphere). With a cerium-containing mixed oxide comprising $ZrO_2$, for example, the cerium-containing mixed oxide is more stable than pure $CeO_2$ after aging at high temperatures (e.g., about 800° C. to about 1,000° C.), particularly with respect to surface area. After high temperature operation, cerium-containing mixed oxide retains significantly higher surface area than pure $CeO_2$ (e.g., 16 m$^2$/g for aged cerium oxide (J. Kaspar et al., Catalyst Today, Vol. 50, pp. 285–298 (1999)), and 47 m$^2$/g for aged zirconium oxide-cerium oxide (75% cerium oxide)). Accordingly, with cerium-containing mixed oxide, there is relatively more surface area to support platinum after aging than with pure $CeO_2$. As a result, a smaller amount of cerium-containing mixed oxide will provide the same level of efficiency, in terms of sulfate decomposition, as compared to a larger amount of pure $CeO_2$. This is advantageous because smaller amounts of total ceria will lead to a smaller fuel consumption penalty, particularly when the catalyst is in the fresh state.

In another advantage, in a $NO_x$ adsorber comprising platinum supported on a cerium-containing mixed oxide, improved dispersion and less sintering of platinum and even $BaSO_4$ is observed after aging with an inlet temperature of 750° C. for a period of 6.5 hours of engine exhaust. As shown in Table II, with cerium-containing mixed oxide in the washcoat, platinum and $BaSO_4$ are present as much smaller crystallites after aging with an inlet temperature of 750° C. for a period of 6.5 hours of engine exhaust. than with a composition of the prior art, indicating improved platinum and $BaSO_4$ dispersion and comparatively less sintering. Accordingly, improved durability with respect to $NO_x$ trapping efficiency, sulfate decomposition, sulfur release, and $NO_x$ conversion, after aging, is observed with a $NO_x$ adsorber composition comprising platinum supported on a cerium-containing mixed oxide.

The $NO_x$ abatement compositions disclosed herein have particular utility when used with lean-burn engines. Lean-burn engines are those which, at least during part of their operation, operate with air to fuel ratios greater than combustion stoichiometry. For gasoline engines, that range is usually about 19 to about 55 and for diesel the range is usually about 19 to about 40.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A $NO_x$ adsorber composition comprising:
    a substrate; and
    a washcoat, wherein said washcoat comprises a catalytic metal component, a trapping material, and a porous support, wherein said porous support comprises cerium oxide and an oxygenated metal selected from the group consisting of lanthanum oxide, yttrium oxide, neodymium oxide, and combinations comprising at least one of the foregoing oxygenated metals.

2. A $NO_x$ adsorber composition according to claim 1, wherein the porous support further comprises a support material selected from the group consisting of gamma-alumina, delta-alumina, theta alumina, and combinations comprising at least one of the foregoing support materials.

3. A $NO_x$ adsorber composition according to claim 1, wherein said catalytic metal component is selected from the group consisting of platinum, palladium, rhodium, ruthenium, iridium, osmium, and alloys and mixtures comprising at least one of the foregoing.

4. A $NO_x$ adsorber composition according to claim 3, wherein said catalytic metal component is present in an amount of up to about 5 wt %, based upon the total weight of the washcoat.

5. A $NO_x$ adsorber composition according to claim 3, wherein said catalytic metal component is present in an amount of 0.2 wt % to about 3 wt %, based upon the total weight of the washcoat.

6. A $NO_x$ adsorber composition according to claim 1, wherein said trapping material is selected from the group consisting of alkali metals, alkaline earth metals, and mixtures comprising at least one of the foregoing.

7. A $NO_x$ adsorber composition according to claim 6, wherein said trapping material is selected from the group consisting of barium, lithium, sodium, cesium, potassium, magnesium, strontium, and mixtures comprising at least one of the foregoing.

8. A $NO_x$ adsorber composition according to claim 6, wherein said trapping material is present in an amount of up to about 50 wt %, based upon the total weight of the washcoat.

9. A $NO_x$ adsorber composition according to claim 8, wherein said trapping material is present in an amount of up to about 40 wt %, based upon the total weight of the washcoat.

10. A $NO_x$ adsorber composition according to claim 9, wherein said trapping material is present in an amount of about 5 wt % to about 20 wt %, based upon the total weight of the washcoat.

11. A $NO_x$ adsorber composition according to claim 9, wherein said trapping material further comprises about 7 wt % to about 20 wt % barium and about 2 wt % to about 5 wt % potassium, based upon the total weight of the washcoat.

12. A $NO_x$ adsorber composition according to claim 1, wherein said cerium-containing mixed oxide is present in an amount of up to about 50 wt %, based upon the total weight of the washcoat.

13. A $NO_x$ adsorber composition according to claim 12, wherein said cerium-containing mixed oxide is present in an amount of about 3 wt % to about 25 wt %, based upon the total weight of the washcoat.

14. A method for removing $NO_x$ from an exhaust stream, comprising:
    disposing a $NO_x$ adsorber composition in the exhaust stream, said $NO_x$ adsorber composition comprising a substrate, and a washcoat, wherein said washcoat comprises a catalytic metal component, a trapping material, and a porous support, wherein said porous support comprises cerium oxide and an oxygenated metal selected from the group consisting of lanthanum oxide, yttrium oxide, neodymium oxide, and combinations comprising at least one of the foregoing oxygenated metals;
    introducing exhaust gas to the $NO_x$ adsorber composition; and
    adsorbing $NO_x$.

15. A method for removing $NO_x$ from an exhaust stream according to claim 14, wherein the porous support further comprises a support material selected from the group consisting of gamma-alumina, delta-alumina, theta alumina, and combinations comprising at least one of the foregoing support materials.

16. A method for removing $NO_x$ from an exhaust stream according to claim 14, wherein said catalytic metal component is selected from the group consisting of platinum, palladium, rhodium, ruthenium, iridium, osmium, and alloys and mixtures comprising at least one of the foregoing.

17. A method for removing $NO_x$ from an exhaust stream according to claim 14, wherein said cerium-containing mixed oxide is present in an amount of up to about 50 wt %, based upon the total weight of the washcoat.

18. A method for removing $NO_x$ from an exhaust stream according to claim 17, wherein said cerium-containing mixed oxide is present in an amount of about 3 wt % to about 25 wt %, based upon the total weight of the washcoat.

19. A method for removing $NO_x$ from an exhaust stream according to claim 14, wherein said trapping material is selected from the group consisting of alkali metals, alkaline earth metals, and mixtures comprising at least one of the foregoing.

20. A method for removing $NO_x$ from an exhaust stream according to claim 19, wherein said trapping material is selected from the group consisting of barium, lithium, sodium, cesium, potassium, magnesium, strontium, and mixtures comprising at least one of the foregoing.

21. A method for removing $NO_x$ from an exhaust stream according to claim 19, wherein said trapping material is present in an amount of up to about 40 wt %, based upon the total weight of the washcoat.

22. A method for removing $NO_x$ from an exhaust stream according to claim 21, wherein said trapping material is present in an amount of about 5 wt % to about 20 wt %, based upon the total weight of the washcoat.

23. A method for removing $NO_x$ from an exhaust stream according to claim 14, wherein said trapping material further comprises about 7 wt % to about 20 wt % barium and about 2 wt % to about 5 wt % potassium, based upon the total weight of the washcoat.

24. A method for making a $NO_x$ adsorber composition, comprising:
    disposing a washcoat, wherein said washcoat comprises a catalytic metal component, a trapping material and a porous support, wherein said porous support comprises cerium oxide and an oxygenated metal selected from the group consisting of lanthanum oxide, yttrium oxide, neodymium oxide, and combinations comprising at least one of the foregoing oxygenated metals on a substrate; and calcining the substrate.

25. A method for making a $NO_x$ adsorber composition according to claim 24, further comprising disposing said catalytic metal component to said substrate subsequent to applying said porous support comprising said cerium oxide and said oxygenated metal.

26. A method for making a $NO_x$ adsorber composition according to claim 24, further comprising disposing said trapping material onto said substrate subsequent to applying said porous support.

27. A method for making a $NO_x$ adsorber composition according to claim 24, further comprising applying a second catalytic metal component to said calcined substrate.

28. A method for making a $NO_x$ adsorber composition according to claim 24, further comprising applying said catalytic metal component to said substrate, subsequent to calcining the substrate.

29. A method for making a $NO_x$ adsorber composition according to claim 28, further comprising applying said trapping material to the substrate subsequent to applying said catalytic metal component.

* * * * *